United States Patent [19]

Hoffmann et al.

[11] Patent Number: 4,796,662
[45] Date of Patent: Jan. 10, 1989

[54] VALVE ARRANGEMENT WITH MAIN SHIFTING VALVE AND PILOT CONTROL VALVE

[75] Inventors: Ruediger Hoffmann, Sindelfingen; Dieter Feichtiger, Aidlingen; Paul Schwerdt, Freudenstadt, all of Fed. Rep. of Germany

[73] Assignee: Daimler-Benz Aktiengesellschaft, Stuttgart, Fed. Rep. of Germany

[21] Appl. No.: 197,268

[22] Filed: May 23, 1988

[30] Foreign Application Priority Data

May 22, 1987 [DE] Fed. Rep. of Germany ....... 3717341

[51] Int. Cl.⁴ ............... F15B 13/043; F16K 31/42
[52] U.S. Cl. ...................... 137/596.16; 251/30.02; 251/129.17
[58] Field of Search ............. 137/596.16; 251/30.02, 251/30.05, 129.17

[56] References Cited

U.S. PATENT DOCUMENTS 4,409,638 10/1983 Sturman et al. ............ 251/30.02 X

Primary Examiner—Gerald A. Michalsky
Attorney, Agent, or Firm—Barnes & Thornburg

[57] ABSTRACT

A valve arrangement with a main shifting valve and a pilot control valve in which the main shifting valve controls the connection between an inlet line and an outlet line. Depending on the position of the pilot control valve, a control pressure space is connected with the inlet line and is therewith acted upon with the inlet pressure, respectively, is relieved of the pressure by a connection with an essentially pressureless return line in order to close, respectively, open the main shifting valve. As the inlet, outlet and return lines terminate on the same bottom side of the socket, the valve arrangement can be arranged in a particularly simple manner on a line plate of a hydraulic, respectively, pneumatic shifting arrangement.

16 Claims, 2 Drawing Sheets

VALVE ARRANGEMENT WITH MAIN SHIFTING VALVE AND PILOT CONTROL VALVE

BACKGROUND AND SUMMARY OF THE INVENTION

The present invention relates to a valve arrangement with a main shifting valve and a pilot control valve, whereby a valve member of the pilot control valve movable between two valve seats is adapted to be sealingly pressed against one valve seat by means of a plunger externally actuatable, for example, by electromagnets and thereby closes off a connection of an inlet line with a control pressure space which is opened up when placed against the other valve seat as well as opens up a connection between the control pressure space and a return line which is closed off when placed against the other valve seat.

Such a valve arrangement is the subject of the DE-PS No. 29 38 100. The pilot control valve can be actuated with very small forces, and more particularly also when the main shifting valve is to control a large opening cross section with high pressure differences between inlet and outlet side of the valve arrangement.

However, the valve arrangement illustrated in the DE-PS No. 29 38 100 is less suited for the use of hydraulic shifting arrangements which possibly must consist of several such valve arrangements because in such a case the lines to be provided between the valve arrangements are difficult to install.

It is known from the DE-OS No. 22 60 938 to construct a valve unit in such a manner that all line connections are arranged on one end face of a socket or the like. However, the DE-OS No. 22 60 938 relates to a valve arrangement which differs pronouncedly from a constructive point of view so that no further suggestions are provided therein as regards the construction of a valve arrangement of the first-mentioned type.

A valve subassembly is described in the DE-OS No. 31 30 581 in which a valve ball cooperates with two valve seats arranged coaxially to one another, which are adjoined by lines controlled by the valve ball. One valve seat is thereby arranged at the bottom of a cup-like housing whereas the other valve seat is provided at a valve seat part which is inserted into the open end of the cup-like housing in the manner of a plug. The connections of the valve subassembly are arranged at the circumferential wall of the cup-like housing, at the end face bottom thereof as well as at the valve seat forming the other housing end face. As to the rest, the valve ball is controlled directly, i.e., not by means of a pilot control valve.

The DE-PS No. 31 10 839 relates to a closure valve in which inlet and outlet lines terminate on the same side in a chamber whose oppositely disposed side is formed by a diaphragm which can be pressed onto the orifice of the outlet line by means of a plunger or the like in order to interrupt the connection of inlet and outlet line by way of the chamber.

It is now the object of the present invention to provide a valve arrangement of the aforementioned type whereby, on the one hand, a particularly simple construction and, on the other, the possibility of a simple integration into hydraulic shifting arrangements is to be made possible.

The underlying problems are solved according to the present invention in that the inlet, outlet and return lines are arranged extending through a socket part of the valve arrangement and terminating at the same end face of the socket part, in that the socket part has a cup-like recess at its end face opposite the orifices in which terminate the inlet and outlet lines on the bottom side, whereby the seat of the main shifting valve is arranged at the orifice of the outlet line, in that the valve housing part is inserted into the cup-like recess in the manner of a plug while leaving free an intermediate space, in that the valve seat part rests on the end face of the valve housing part opposite the bottom of the cup-like recess in the manner of a cover and holds fast at the facing circumferential edge of the valve housing part a sealing ring sealing the valve housing part in the cup-like recess, and in that a sleeve member surrounding the socket part is arranged at the latter under formation of an annular space which, on the one hand, is connected with the return line and, on the other, with a space present on the end face of the valve seat part opposite the valve housing part which space is connected with the chamber by way of the opening adjoining the valve seat in the valve seat part.

A particularly simple type of construction is achieved by the present invention. The sleeve member surrounding the socket part can secure directly or indirectly the position of the valve housing part as well as of the valve seat part in, respectively, on the cup-like recess of the socket part. The sealing ring held fast by the valve seat part at the circumferential edge of the valve body member facing the valve seat part can seal, on the one hand, the annular gap between the valve housing part and the circumferential wall of the cup-like recess and, on the other, also the gap plane between the valve housing part and the valve seat part. As to the rest, the sleeve member can also retain an electromagnet or another actuating device for the valve arrangement.

In particular the possibility is created by the present invention to arrange the socket part on a line plate and to connect the inlet, outlet and return lines with lines extending within the plate in that openings, respectively, orifices of the plate-side lines which correspond with the orifices of the inlet, outlet and return lines, are provided at the fastening locations of the socket on the plate.

According to a preferred embodiment of the present invention, the end face of the sleeve member opposite the socket can be closed off by means of a diaphragm whose edge is sealingly clamped-in between a ring-shaped collar arranged at the sleeve member and an intermediate member which supports the valve seat part axially on the collar.

The intermediate member may be provided with a bore for the guidance of a plunger member whose one end cooperates with the valve member of the pilot control valve and whose other rounded-off, respectively, mushroom-head-like end abuts at the diaphragm so that the plunger member is adjustable by pressure on the diaphragm.

The diaphragm is practically not acted upon by any significant pressure forces if a line is arranged in the intermediate member which connects a space remaining between the diaphragm and the intermediate member within the area of the plunger member with the space connected with the return line on the side of the valve seat part opposite the valve housing part.

The sleeve member, respectively, the ring-shaped collar arranged thereat may carry the electromagnet having a core, respectively, adjusting member coaxial with the plunger member.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
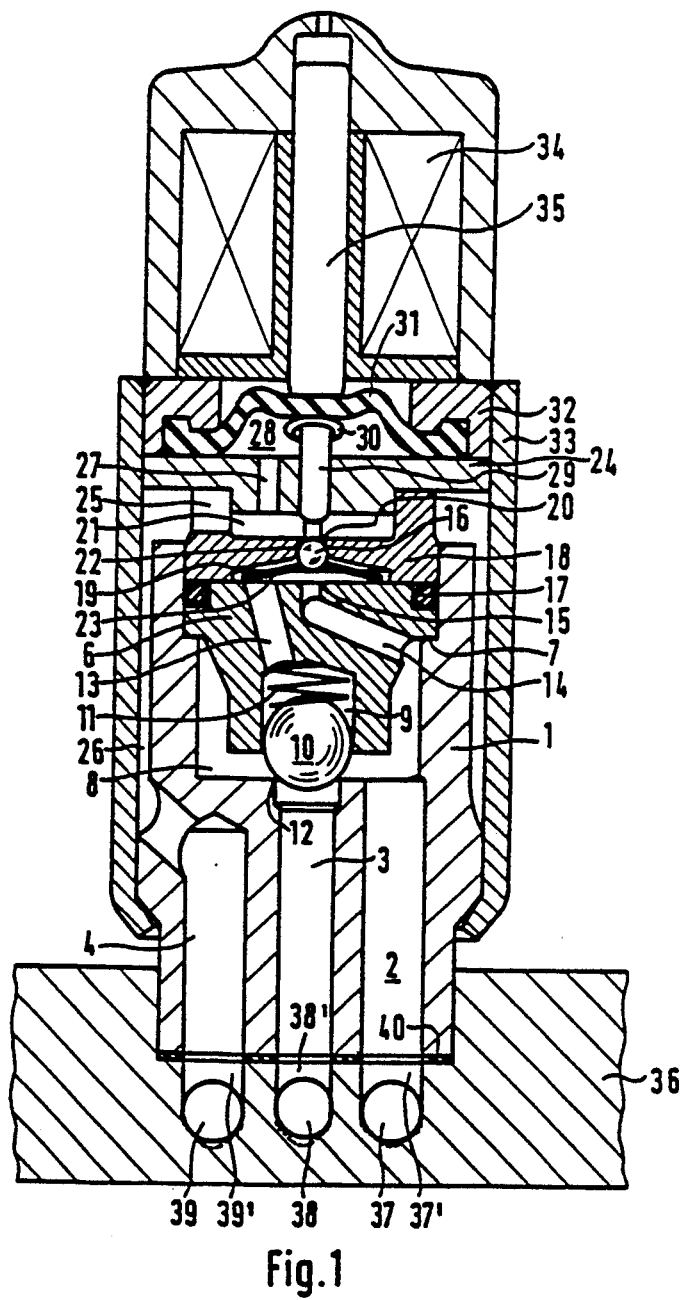
FIG. 1 is a cross-sectional view of a valve arrangement in accordance with the present invention which is arranged on a line plate.

Referring now to the drawing wherein like reference numerals are used throughout the various views to designate like parts, the valve arrangement illustrated in FIG. 1 includes a base socket 1 having a circular lower end face and a circular cross section. Inside of the socket 1 are arranged an inlet line 2, an outlet line 3 as well as a return line 4 with orifices on the lower end face of the socket 1 within an axial plane.

The inlet line 2 as well as the outlet line 3 extend up to a cup-like recess at the upper end face of the socket 1 as viewed in FIG. 1. The valve housing part 6 is inserted into this cup-like recess from the upper end face of the socket 1, as viewed in FIG. 1, in the manner of a plug whereby the valve housing part 6 abuts with an area of larger diameter at an annular step 7 in the circumferential wall of the cup-like recess. A spacer, respectively, annular space 8 remains between the bottom of the cup-like recess as well as the inner circumferential wall thereof and the valve housing part 6.

A control pressure space 9 constructed as dead-end bore is arranged in the valve housing part 6 in extension of the outlet line 3 arranged coaxially to the center axis of the socket 1; the control pressure space 9 displaceably receives a valve ball 10 in the manner of a guidance. The valve ball 10 is acted upon by means of a coil compression spring 11 against a seat 12 arranged at the facing end of the outlet line 3. As to the rest, the control pressure space 9 is connected with the upper end face of the valve housing part 6, as viewed in FIG. 1, by means of a line 13 which extends through the valve housing part 6 eccentrically.

Furthermore, a line 14 leads from the spacer, respectively, annular space 8 to an opening arranged in the center of the upper end face of the valve housing part 6, as viewed in FIG. 1, which forms a valve seat 15 for a further small valve ball 16.

The valve housing part 6 is sealed off in the cup-like recess by means of a sealing ring 17 which is accommodated in a step-shaped recess at the circumferential edge of the upper end face of the valve housing part 6 and is retained thereat by means of a valve seat part 18 resting on the aforementioned upper end face of the valve housing part 6. The valve seat part 18 which protrudes slightly into the cup-like recess of the socket 1 in extension of the valve housing part 6, surrounds an intermediate space 19 in which terminate the lines 13 and 14 and which is connected by way of an opening 20 with a space 21 on the upper end face of the valve seat part 18. The lower end of the opening 20, as viewed in FIG. 1, is constructed as further valve seat 22 of the valve ball 16 which is stressed against the valve seat 22 by means of a cup-like spring 23.

The valve seat part 18 is supported on a disk-shaped intermediate member 24 by means of an annular web arranged on its upper end face, as viewed in FIG. 1, whereby the annular web of the valve seat part 18 extends around an annular step on the facing end face of the intermediate member 24.

The space 21 enclosed between the valve seat part 18 and the intermediate member 24 is thereby connected by way of an opening 25 in the annular web of the valve seat part 18 with an annular space 26 partially surrounding the socket 1 as well as by way of an axial bore 27 eccentrically arranged in the intermediate member 24 with a space 28 on the upper end face of the intermediate member 24, as viewed in FIG. 1.

A plunger member 29 is guided in an axial central bore of the intermediate member 24; the lower tapered end of the plunger member 29 cooperates with the valve ball 16 and permits to press the same against the valve seat 15 against the force of the spring 23. The tapered lower end of the plunger member 29 has a smaller diameter than the opening 20 so that the opening 20 remains open or pervious when the plunger member 29 presses the valve ball 16 against the valve seat 15. A mushroom-shaped plastic head 30 is arranged at the upper rounded-off end of the plunger member 29 which abuts at the inside of a diaphragm 31 that closes off the space 28 in the upward direction.

The diaphragm 31 includes a thickened circumferential edge which is fixed between the outer area of the intermediate member 24 and a ring-shaped collar 32 which, in its turn, is welded on at a sleeve member 33. The collar 32 has an end face matched to the shape of the edge of the diaphragm 31 and facing the intermediate member 24 and, as to the rest, also serves the purpose to axially fix the intermediate member 24.

The end face of the sleeve member 33 opposite the collar 32 is form-lockingly and force-lockingly fixed over a circumferential bead of the socket 1 in that the wall of the sleeve member 33 is fixedly pressed onto the circumferential bead of the socket 1 and is deforme underneath the circumferential bead in FIG. 1 in such a manner that the lower side of the circumferential bead is surrounded.

The sleeve member 33 closes off the annular space 26 toward the outside which is connected by an inclined bore in the socket part 1 with the return line 4.

An electromagnet 34 with a core 35 is arranged on the collar 32 which upon energization of the winding of the electromagnet 34 is displaced from the position illustrated in FIG. 1 in the downward direction and thereby presses on the diaphragm 31 as well as the plunger member 29 so that the latter displaces the valve ball 16 against the seat 15. As 10 soon as the coil of the electromagnet 34 becomes currentless, the cup-like spring 23 again displaces the valve ball 16 against the upper valve seat 22 whereby at the same time the plunger member 29 as well as the core 35 are returned into the position illustrated in FIG. 1.

The illustrated valve arrangement operates in the following manner:

The inlet line 2 of the valve arrangement is assumed to be connected with a pressure source whereas the outlet line 3 is connected to a load. The retrn line 4 leads to an essentially pressureless reservoir.

The valve ball 10 forms the shifting member of a main control valve and controls the connection between the inlet line 2 and the outlet line 3 which has a relatively large cross section.

The valve ball 16 forms the shifting member of a pilot control valve for the control of the movement of the valve ball 10.

FIG. 1 now illustrates the shifting condition of the valve arrangement in the case that the valve ball 16 of the pilot control valve rests against the upper seat 22.

In this position of the valve ball 16, the opening 20 is closed, i.e., the intermediate space 19 has no connection whatsoever with the return line 4, respectively, with the spaces 21 and 26 in communication therewith.

In the illustrated position of the valve ball 16, the inlet line 2 is connected by way of the spacer or annular space 8, the line 14, the intermediate space 19 and the line 13 with the control pressure space 9 so that practically the same pressure is present in the control pressure space 9 as in the inlet line 2, i.e., a pressure exists in the control pressure space 9 which corresponds to the pressure of the pressure source connected to the inlet line 2. The pressure in the control pressure space 9 suffices in conjunction with the force of the spring 11 to press the valve ball 10 against the seat 12 so that the connection between inlet line 2 and outlet line 3 is closed.

By actuation of the electromagnet 34, the plunger member 29 is displaced downwardly in such a manner that the valve ball 16 is pressed against the lower seat 15. The line 14 is thereby closed, i.e., the intermediate space 19 has no longer any connection with the inlet line 2. Instead, the intermediate space 19 is now connected by way of the now opened opening 20 with the space 21, the annular space 26 and therewith with the return line 4. The intermediate space 19 as well as the control pressure space 9 connected therewith by way of the line 13 become oorrespondingly practically free of pressure. This has as a consequence that the pressure prevailing in the spacer or annular space 8 which by reason of the connection of this space with the inlet line 2 corresponds to the pressure in the inlet line 2, is able to displace the valve ball 10 upwardly against the force of the spring 11. As a result thereof, the inlet line 2 and outlet line 3 are connected with each other.

As soon as the electromagnet 34 is again shifted, i.e., is de-energized, the cup-like spring 23 is again able to displace the valve ball 16, the plunger member 29 as well as the core 35 upwardly into the position illustrated in FIG. 1 so that the control pressure space 9 is again acted upon by the pressure in the inlet line 2 and the valve ball 10 assumes the closing position illustrated in FIG. 1.

Under all shifting conditions of the valve arrangement, the space 28 underneath the diaphragm 31 is practically pressure-free, for this space 28 is permanently connected with the return line 4 leading to the essentially pressureless reservoir by way of the line 27, the space 21 and the annular space 26.

The valve ball 16 can be displaced with slight force application. A comparatively weak electromagnet 34 suffices accordingly, even though the movements of the valve ball 10 of the main shifting valve control a large cross section with possibly large pressure forces.

As the inlet, outlet and return lines 2 to 4 all terminate on the same end face of the socket 1, the valve arrangement in accordance with the present invention can be arranged in a particularly simple manner on a line plate 36 and can be connected with channels 37 to 39 arranged therein of a hydraulic shifting arrangement. According to FIGS. 1 and 3, recesses are arranged for that purpose on one side of the line plate 36 whose cross section corresponds to the cross section of the socket 1. The channels 37 to 39 terminate with openings 37' to 39' at the bottom of this recess whereby these openings 37' to 39' are arranged corresponding to the orifices of the inlet, outlet and return lines 2 to 4. The mentioned openings can be correspondingly brought into alignment with the mentioned lines if the valve arrangement is inserted with its socket 1 into the recess of the line plate 36. A sealing disk 40 is inserted between the bottom of the recess in the line plate 36 and the facing end face of the socket 1 in order to separate from one another the lines 2 to 4, respectively, the openings 37' to 39'.

Figure 2:
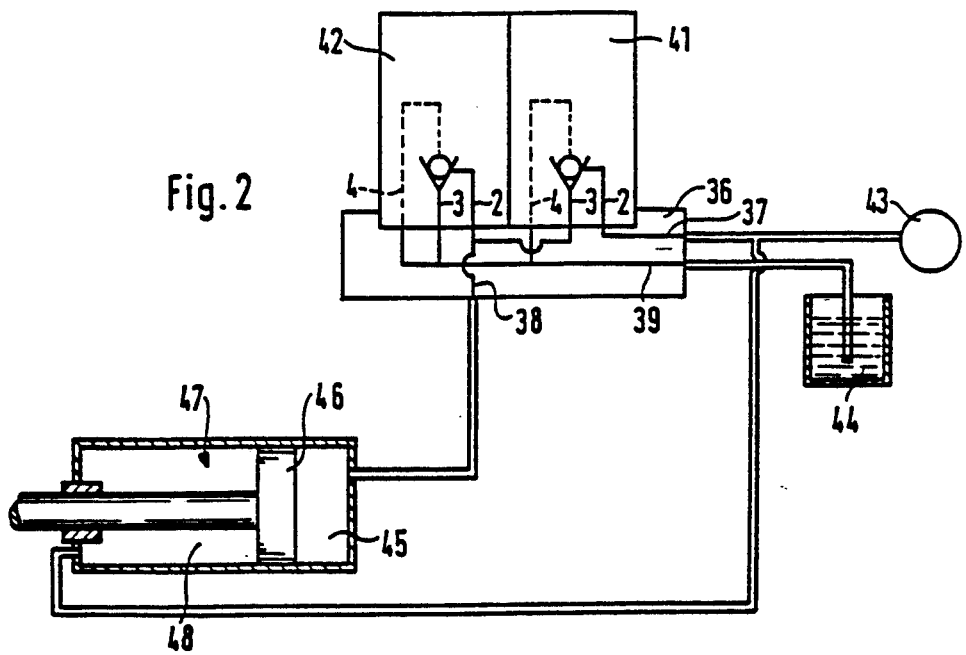
FIG. 2 is a schematic view of a hydraulic shifting arrangement with two valve arrangements according to the present invention.
Figure 3:
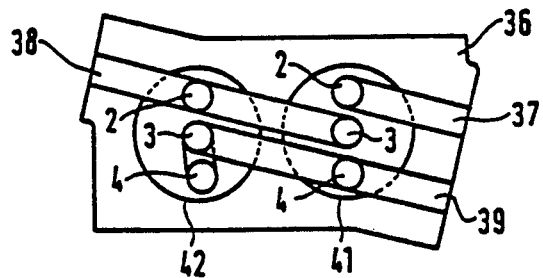
FIG. 3 is a plan view on the line plate carrying the valve arrangements of FIG. 2.

FIGS. 2 and 3 now illustrate an example for a hydraulic shifting arrangement which can be realized in an advantageous manner with the valve arrangements according to the present invention.

According to FIG. 3, two valve arrangements 41 and 42 are arranged on the line plate 36 having the channels 37 to 39, and more particularly in such a manner that the channel 37 is connected only with the inlet line 2 of the valve arrangement 41 whereas the channel 38 is connected with the outlet line 3 of the valve arrangement 41 and the inlet line 2 of the valve arrangement 42 and the channel 39 is connected with the return line 4 of the valve arrangement 41 as well as the outlet line 3 and with the return line 4 of the valve arrangement 42.

As illustrated schematically in FIG. 2, the channel 37 is additionally connected with a pressure source 43. The channel 39 is connected with an essentially pressureless reservoir 44. The channel 38 is connected with a chamber 45 on the side of the piston 46 of a piston-cylinder aggregate 47 opposite the piston rod, whose chamber 48 is connected to the pressure source 43 on the side of the piston 46 connected with the piston rod.

By a corresponding control of the valve arrangements 41 and 42, the chamber 45 can be connected either with the pressure source 43 or with the reservoir 44. In the former case, approximately the same pressure prevails in the chamber 45 as in the pressure source 43, respectively, in the chamber 48. As the pressure forces in the chambers 45 and 48 act on differently large piston areas (in the case of the chamber 45, on the entire piston cross section, in the case of the chamber 48, only on the piston cross section reduced by the cross section of the piston rod), the piston 46 moves toward the left in FIG. 2 when the chamber 45 carries the pressure of the pressure source 43.

As soon as the chamber 45 is connected with the reservoir 44 and therewith becomes pressureless, the piston 46 moves toward the right, as viewed in FIG. 2, by reason of the pressure of the pressure source 43 in the chamber 48.

The valve arrangements 41 and 42 are each so controlled that the valve ball 10 of the valve arrangement 41 opens up the connection between the inlet line 2 and the outlet line 3 of this valve arrangement 41 when the valve ball 10 of the valve arrangement 42 closes the connection between the ineet line 2 and the outlet line 3 of this valve arrangement 42. In contrast thereto, the valve ball 10 of the valve arrangement 42 opens the connection between the inlet line 2 and the outlet line 3 of this valve arrangement 42 when the corresponding connection of the valve arrangement 41 is closed by the valve ball 10 thereof. Correspondingly, the chamber 45 of the piston cylinder aggregate 47 is connected either by way of the valve arrangement 41 with the pressure source or by way of the valve arrangement 42 with the reservoir 44 so that the movements of the piston 46 described hereinabove are produced.

When the valve balls 10 of both valve arrangements 41 and 42 are brought into their closing position (compare FIG. 1), the piston 46 is stopped.

The described hydraulic shifting arrangement is advantageous, inter alia. because the connections of the lines 2 to 4 of the valve arrangements 41 and 42 are connected inside of the line plate 36 by rectilinear channels 37 to 39 whereby similar valve arrangements in the same installed position can be used both for the pressure actuation of the load, respectively, of the chamber 45 of the piston-cylinder aggregate 47 as also for the pressure relief.

The described shifting arrangement, as also the valve arrangements, are suitable in principle also for pneumatic media.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A valve arrangement comprising main shifting valve means, pilot control valve means including a valve member movable between two valve seats, said valve member being operable to be sealingly pressed against one valve seat by means of an externally actuatable plunger means and thereby closes off a connection between an inlet line with a control pressure space which is opened up when placed against the other valve seat and at the same time also opens a connection between the control pressure space and a return line which is closed off when the valve member of the pilot control valve means is placed against the other valve seat, said main shifting valve means including a main valve member displaceable into a closing position by the pressure in the control pressure space when the connection between the inlet line and the control pressure space is open, said main valve member being displaceable into the control pressure space at least partly in the manner of a displacement member, the main valve member being operable to be sealingly pressed against its seat arranged between the inlet line and an outlet line when displaced into its closing position, valve housing means accommodating the control pressure space, the one valve seat of the pilot control valve means being provided at the other end face of the valve housing means opposite the control pressure space, a valve seat part arranged at said other end face of the valve housing means and providing the other valve seat of the pilot control valve means, a first intermediate space means operatively connected with the inlet line remaining between the seat of the main shifting valve means and the valve housing means, a second intermediate space means remaining between the valve seat part and the valve housing means, said second intermediate space means being operatively connected, respectively, operatively connectable by way of a line extending through the valve housing means with the first intermediate space means, by way of a further line extending through the valve housing means with the control pressure space and by way of an opening adjoining the other valve seat of the pilot control valve means respectively controlled by the valve member of the pilot control valve means with the return line, the inlet, outlet and return lines being arranged extending through a socket means of the valve arrangement and terminating at the same end face of the socket means, the socket means being provided at its end face opposite the orifices with a cup-like recess in which the inlet and outlet lines terminate on the side of the bottom, the seat of the main shifting valve means being arranged at the inlet orifice of the outlet line, the valve housing means being inserted into the cup-like recess in the manner of a plug while leaving free the first intermediate space means, the valve seat part resting on the end face of the valve housing means opposite the bottom of the cup-like recess in the manner of a cover and holding fast a sealing ring sealing the valve housing means in the cup-like recess at the facing circumferential edge of the valve housing means, sleeve means surrounding the socket means being arranged at the socket means under formation of an annular space which is operatively connected, on the one hand with the return line, and on the other, with a space present on the end face of the valve seat part opposite the valve housing means, said last-mentioned space being operatively connected with the second intermediate space means by way of an opening adjoining the other valve seat in the valve seat part.

2. A valve arrangement according to claim 1, wherein the inlet, outlet and return lines are arranged approximately parallel to one another in a common axial plane of the socket means.

3. A valve arrangement according to claim 2, wherein the socket means is arranged on a line plate means and the inlet, outlet and return lines are connected with lines extending in the line plate means.

4. A valve arrangement according to claim 3, wherein the end face of the sleeve means opposite the socket means is closed off by means of a diaphragm means whose edge is sealingly clamped in between a ring-shaped collar arranged at the sleeve means and an intermediate member which axially support the valve seat part on the collar.

5. A valve arrangement according to claim 4, wherein a bore is provided in the intermediate member for the guidance of the plunger means whose one end cooperates with the valve member of the pilot control valve means and whose other end abuts at the diaphragm means.

6. A valve arrangement according to claim 5, wherein said last-mentioned other end is rounded-off or mushroom-head-like shaped.

7. A valve arrangement according to claim 5, wherein a line is arranged in the intermediate member which connects a space between the diaphragm means and the intermediate member at the plunger means with the space connected with the return line on the side of the valve seat part opposite the valve housing means.

8. A valve arrangement according to claim 7, further comprising an electromagnet means arranged at one of sleeve means and collar.

9. A valve arrangement according to claim 8, wherein the electromagnet means includes one of core and adjusting member coaxial with the plunger means.

10. A valve arrangement according to claim 7, further comprising line plate means with at least two valve arrangements arranged thereon as well as three lines arranged therein, of which one is adapted to be connected with a pressure source, another with a load and still another with a reservoir, the inlet line of one valve arrangement being operatively connected by way of the line of the line plate means which is connected with the load, with the outlet line of the other valve arrangement, the line of the line plate means connected with the pressure source being operatively connected with the inlet line of the other valve arrangement and the line of the line plate means connected with the reservoir operatively connecting the return line of the other valve arrangement with the outlet line as well as the return line of the one valve arrangement.

11. A valve arrangement according to claim 1, wherein the socket means is arranged on a line plate means and the inlet, outlet and return lines are connected with lines extending in the line plate means.

12. A valve arrangement according to claim 1, wherein the end face of the sleeve means opposite the socket means is closed off by means of a diaphragm means whose edge is sealingly clamped in between a ring-shaped collar arranged at the sleeve means and an intermediate member which axially support the valve seat part on the collar.

13. A valve arrangement according to claim 12, wherein a bore is provided in the intermediate member for the guidance of the plunger means whose one end cooperates with the valve member of the pilot control valve means and whose other end abuts at the diaphragm means.

14. A valve arrangement according to claim 12, wherein a line is arranged in the intermediate member which connects a space between the diaphragm means and the intermediate member at the plunger means with the space connected with the return line on the side of the valve seat part opposite the valve housing means.

15. A valve arrangement according to claim 12, further comprising an electromagnet means arranged at one of sleeve means and collar.

16. A valve arrangement according to claim 1, further comprising line plate means with at least two valve arrangements arranged thereon as well as three lines arranged therein, of which one is adapted to be connected with a pressure source, another with a load and still another with a reservoir, the inlet line of one valve arrangement being operatively connected by way of the line of the line plate means which is connected with the load, with the outlet line of the other valve arrangement, the line of the line plate means connected with the pressure source being operatively connected with the inlet line of the other valve arrangement and the line of the line plate means connected with the reservoir operatively connecting the return line of the other valve arrangement with the outlet line as well as the return line of the one valve arrangement.

* * * * *